US012808797B2

(12) United States Patent
Kim et al.

(10) Patent No.: US 12,808,797 B2
(45) Date of Patent: Nov. 24, 2026

(54) TURBIDITY SENSOR AND METHOD FOR CONTROLLING TURBIDITY SENSOR

(71) Applicant: LG ELECTRONICS INC., Seoul (KR)

(72) Inventors: Hyunchul Kim, Seoul (KR); Hosik Kang, Seoul (KR); Myungwon Lee, Seoul (KR); Soonyoung Min, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 142 days.

(21) Appl. No.: 17/790,350

(22) PCT Filed: Dec. 31, 2019

(86) PCT No.: PCT/KR2019/018830
§ 371 (c)(1),
(2) Date: Jun. 30, 2022

(87) PCT Pub. No.: WO2021/137331
PCT Pub. Date: Jul. 8, 2021

(65) Prior Publication Data
US 2023/0035406 A1 Feb. 2, 2023

(51) Int. Cl.
*G01N 21/59* (2006.01)
*A47L 15/42* (2006.01)
(Continued)

(52) U.S. Cl.
CPC .......... *G01N 21/59* (2013.01); *A47L 15/4297* (2013.01); *D06F 34/08* (2020.02);
(Continued)

(58) Field of Classification Search
CPC ......... G01N 21/59; G01N 2201/12715; G01N 21/534; G01N 21/274; G01N 15/06;
(Continued)

(56) References Cited

U.S. PATENT DOCUMENTS

2002/0166968 A1 * 11/2002 Bradley .................... G01J 5/24 250/332
2003/0173530 A1 * 9/2003 Schenkl .............. A47L 15/4297 250/573
(Continued)

FOREIGN PATENT DOCUMENTS

EP 0748891 A1 * 12/1996 ............. D06F 39/00
IT TO20120089 A1 * 8/2013 ........... G01N 21/534
(Continued)

*Primary Examiner* — Michael A Lyons
*Assistant Examiner* — Judy Dao Tran
(74) *Attorney, Agent, or Firm* — Birch, Stewart, Kolasch & Birch, LLP

(57) ABSTRACT

The present disclosure provides a turbidity sensor comprising: a light irradiation unit which emits light toward a medium; a light receiving unit which receives light having passed through the medium; a memory which contains a correction value corresponding to a signal received by the light receiving unit; and a processor which corrects the signal received by the light receiving unit by using the correction value and calculates the turbidity of the medium by using the corrected signal.

9 Claims, 9 Drawing Sheets

(51) Int. Cl.

| | |
|---|---|
| *D06F 34/08* | (2020.01) |
| *D06F 34/22* | (2020.01) |
| *D06F 34/26* | (2020.01) |
| *D06F 103/20* | (2020.01) |
| *D06F 103/28* | (2020.01) |

(52) U.S. Cl.

CPC .............. *D06F 34/22* (2020.02); *D06F 34/26* (2020.02); *D06F 2103/20* (2020.02); *D06F 2103/28* (2020.02)

(58) Field of Classification Search

CPC ....... G01N 15/075; D06F 34/22; D06F 34/26; D06F 2103/20; D06F 2103/28; D06F 34/08; A47L 15/42; A47L 15/4297; G01J 1/44; G01J 2001/444

See application file for complete search history.

(56) References Cited

U.S. PATENT DOCUMENTS

| | | | | |
|---|---|---|---|---|
| 2007/0046942 | A1 | 3/2007 | Ng et al. | |
| 2013/0278921 | A1* | 10/2013 | Choi | G01N 21/534 356/51 |
| 2022/0120679 | A1* | 4/2022 | Carr | G01N 21/51 |

FOREIGN PATENT DOCUMENTS

| | | | | |
|---|---|---|---|---|
| JP | 2001-232355 | A | 8/2001 | |
| JP | 2010-213757 | A | 9/2010 | |
| JP | 2016-221077 | A | 12/2016 | |
| KR | 20-1993-0000835 | U | 1/1993 | |
| KR | 1993-0004671 | Y1 | 7/1993 | |
| KR | 970006355 | B1 * | 4/1997 | D06F 33/02 |
| KR | 10-2005-0012522 | A | 2/2005 | |
| KR | 10-2005-0092404 | A | 9/2005 | |
| KR | 10-2011-0029367 | A | 3/2011 | |
| KR | 20110029367 | A * | 3/2011 | G01N 21/27 |
| KR | 10-2013-0119357 | A | 10/2013 | |
| KR | 10-2015-0049150 | A | 5/2015 | |
| KR | 20150049150 | A * | 5/2015 | G01N 27/4065 |
| KR | 10-1684573 | B1 | 12/2016 | |
| WO | WO 2012/154743 | A1 * | 11/2012 | G01N 21/53 |

* cited by examiner

TURBIDITY SENSOR AND METHOD FOR CONTROLLING TURBIDITY SENSOR

CROSS REFERENCE TO RELATED APPLICATIONS

This application is the National Phase of PCT International Application No. PCT/KR2019/018830, filed on Dec. 31, 2019, which is hereby expressly incorporated by reference into the present application.

TECHNICAL FIELD

The present disclosure relates to a turbidity sensor and a method for controlling a turbidity sensor, and is applicable to a technical field for improving a performance and a reliability of the turbidity sensor.

BACKGROUND ART

A turbidity sensor is a sensor for sensing a turbidity of a medium. For example, the turbidity sensor may be used in household appliances such as a washer, a washing machine, and a dryer so as to sense the turbidity or an impurity of the medium such as wash water and dry air.

In general, the turbidity sensor is composed of a light transmitter for radiating light that is propagated via the used medium and a light receiver for receiving the light. The turbidity sensor may sense the turbidity or the impurity of the medium positioned on a path through which the light is radiated and received. The light transmitter of the turbidity sensor may include a diode that converts an electrical signal into a light signal. The light receiver of the turbidity sensor may include a transistor that converts the light propagated via the medium into the electrical signal.

Basically, a method for converting the electrical signal converted via the transistor into a digital signal and sensing the converted digital signal as the turbidity of the medium has been used for the turbidity sensor. However, there has been a problem in that a turbidity sensing performance is deteriorated in the process of converting the electrical signal converted via the transistor into the digital signal.

In addition, during a mass-production process, the turbidity sensor may have a deviation in measured values. For example, a difference between diodes or a difference between the transistors used in a process of manufacturing the turbidity sensors may cause the deviation in the measured values. The deviation in the measured values that occur during the mass-production process has deteriorated a reliability of the turbidity sensor.

DISCLOSURE

Technical Problem

A turbidity sensor according to one embodiment is to reduce reliability deterioration of a measured value occurring in a mass-production process.

In addition, the turbidity sensor according to one embodiment is to reduce performance degradation that occurs in a process of converting an electrical signal received by a light receiver into a digital signal.

Technical Solutions

In order to achieve the above or other purposes, a turbidity sensor according to one embodiment includes a light irradiator for irradiating light toward a medium, a light receiver for receiving the light that has passed through the medium, a memory containing a correction value corresponding to a signal received by the light receiver, and a processor for correcting the signal received by the light receiver using the correction value, and calculating a turbidity of the medium using the corrected signal.

In addition, according to one embodiment, the correction value may offset a deviation occurring in the signals received by the light receiver due to a manufacturing tolerance of the turbidity sensor.

In addition, according to one embodiment, the light receiver may include a transistor applied with a current in response to the received light, and a resistor applied with the current, wherein a voltage corresponding to the received signal is applied across the resistor, and the processor may include a converter for converting the voltage applied across the resistor into a digital signal, wherein a voltage measurement range of the converter corresponds to a variable range of the voltage applied across the resistor.

In addition, according to one embodiment, a maximum measurable voltage of the converter may correspond to a maximum voltage applied across the resistor.

In addition, according to one embodiment, the maximum voltage applied across the resistor may have a magnitude corresponding to a magnitude obtained by subtracting a minimum voltage required to drive the transistor from a fixed voltage applied to the transistor.

In addition, according to one embodiment, the transistor may include a collector applied with the fixed voltage, a base for receiving the light that has passed through the medium, and an emitter applied with the current in response to the light received by the base, wherein the emitter is connected to the resistor, and the fixed voltage applied to the collector may correspond to a voltage having a magnitude obtained by adding the minimum voltage required to drive the transistor to the maximum measurable voltage of the converter.

In order to achieve the above or other purposes, a method for controlling a turbidity sensor according to one embodiment includes irradiating light toward a medium, receiving the light that has passed through the medium, correcting a signal corresponding to the received light using a correction value stored corresponding to the signal corresponding to the received light, and calculating a turbidity of the medium using the corrected signal.

In addition, according to one embodiment, the correction value may be a value offsetting a deviation occurring in the signals corresponding to the received light due to a manufacturing tolerance of the turbidity sensor.

In addition, according to one embodiment, the method may further include generating and storing the correction value.

In addition, according to one embodiment, the generating and the storing of the correction value may include irradiating light toward a medium having a reference turbidity, receiving the light that has passed through the medium, comparing a signal corresponding to the received light with a reference signal, generating the correction value for correcting the signal corresponding to the received light to the reference signal, and storing the correction value corresponding to the signal corresponding to the received light and the reference turbidity.

Advantageous Effects

The turbidity sensor according to one embodiment may improve the reliability thereof by compensating for the deviation in the measured values occurring in the mass-production process.

The turbidity sensor according to one embodiment may improve the performance thereof by reducing the performance degradation that may occur in the process of converting the analog signal into the digital signal.

BEST MODE

Hereinafter, the embodiments disclosed in the present specification will be described in detail with reference to the accompanying drawings. The same reference numbers may be allocated to the same or similar components are given. Redundant descriptions thereof will be omitted. As used herein, a suffix “module” or “unit” as used for a component are intended only for ease of writing the present disclosure, and the suffix “module” or “unit” itself does not have a specific meaning or role. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

Figure 1:
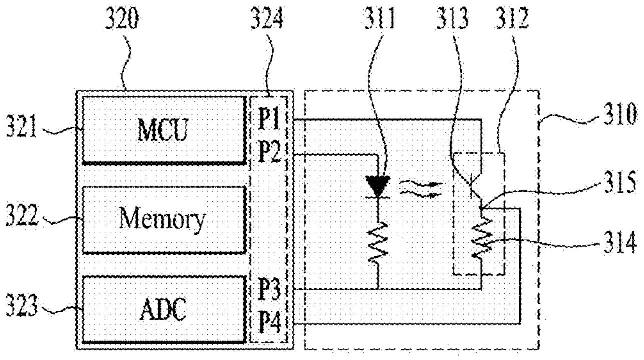
FIG. 1 is a block diagram of a turbidity sensor according to an embodiment.

FIG. 1 is a block diagram of a turbidity sensor according to an embodiment.

A turbidity sensor 300 may include a circuit 310 and a processor 320. The circuit 310 may include a light irradiator 311 for irradiating light and a light receiver 312 for receiving the light. The processor 320 may control, operate, and process a signal applied to the circuit 310 and a signal read via the circuit 310. Specifically, the processor 320 may include a micro controller unit (MCU) 321, a memory 322, and an analog to digital converter (ADC) 323.

The light irradiator 311 of the circuit 310 may irradiate the light toward a medium in response to an applied current or voltage. In this regard, the light irradiator 311 may be a light emitting diode. The light irradiator 311 may irradiate light of a specific wavelength, and the specific wavelength of the light may be a wavelength in an infrared region. In addition, the light irradiator 311 may irradiate light of a specific intensity toward the medium in response to the applied current or voltage.

The light receiver 312 of the circuit 310 may receive the light propagated via the medium and convert the light into an electrical signal. The light receiver 312 may receive at least one of light that has passed through the medium, light bent by the medium, and light reflected by the medium, and may convert the received light into the electrical signal. In this regard, the light receiver 312 may include a transistor 313 that applies a current of a specific magnitude in a specific direction in response to an amount of received light. In addition, the light receiver 312 may include a resistor 314 connected to an emitter of the transistor 313. A fixed high-voltage may be applied to a collector of the transistor 313, and a variable voltage may be applied to the resistor 314 in response to an amount of light received via a base. In this regard, the resistor 314 may be connected to a fixed low-voltage.

An MCU 321 of the processor 320 may control the voltage applied to the light irradiator 311 and the light receiver 312. The voltage applied to the light irradiator 311 and the light receiver 312 may be a voltage for a power supply. Specifically, the MCU 312 may apply a current signal to the light receiver 312 and the light irradiator 311 via a first pin P1 and a second pin P2 of the connector 324, respectively. In some cases, the first pin P1 and the second pin P2 may be formed as one pin. In some cases, the first pin P1 and the second pin P2 may be connected to the voltage for the power supply.

The connector 324 may include a third pin P3 for grounding. The light receiver 312 and the light irradiator 311 may be connected to the third pin P3 so as to generate potential differences with the second pin P2 and the first pin P1, respectively.

The ADC 323 of the processor 320 may measure the voltage applied to the resistor 314 and convert the measured voltage into a digital signal. The ADC 323 may read a potential at a point 315 between the transistor 313 and the resistor 314 via a fourth pin P4 of the connector 324, and may compare the potential with a reference potential to measure the voltage applied to the resistor 314. In this regard, the reference potential may correspond to a ground potential applied to the third pin P3.

The MCU 321 of the processor 320 may measure a turbidity of the medium using the digital signal obtained via the ADC 323. In the case of receiving the light that has passed through the medium, the higher the turbidity of the medium, the lower the voltage applied to the resistor 314 may be. On the other hand, when the light refracted by the medium or reflected by the medium is received, the higher the turbidity of the medium, the higher the voltage applied to the resistor 324 may be.

The ADC 323 of the processor 320 may convert the voltage applied to the resistor 314 to the digital signal in response to the light received by the light receiver 312, and the MCU 321 of the processor 320 may measure the turbidity of the medium via the digital signal converted by the ADC 323.

The MCU 321 of the processor 320 may correct the signal measured by the ADC 323 using correction data stored in the memory 322. In this regard, the signal measured by the ADC 323 may correspond to the voltage across the resistor 314. The ACD 323 of the processor 320 may convert the corrected signal into a digital signal, and thereafter, the MCU 321 of the processor 320 may calculate the turbidity of the medium via the converted digital signal. In this regard, the correction data stored in the memory 322 of the processor 320 may correspond to a value that offsets a deviation occurring in the signal received by the light receiver 312 by a manufacturing tolerance of the turbidity sensors 300. The deviation occurring in the signal received by the light receiver 312 between the turbidity sensors 300 manufactured in the same manner will be described in detail with reference to FIG. 2.

Figure 2:
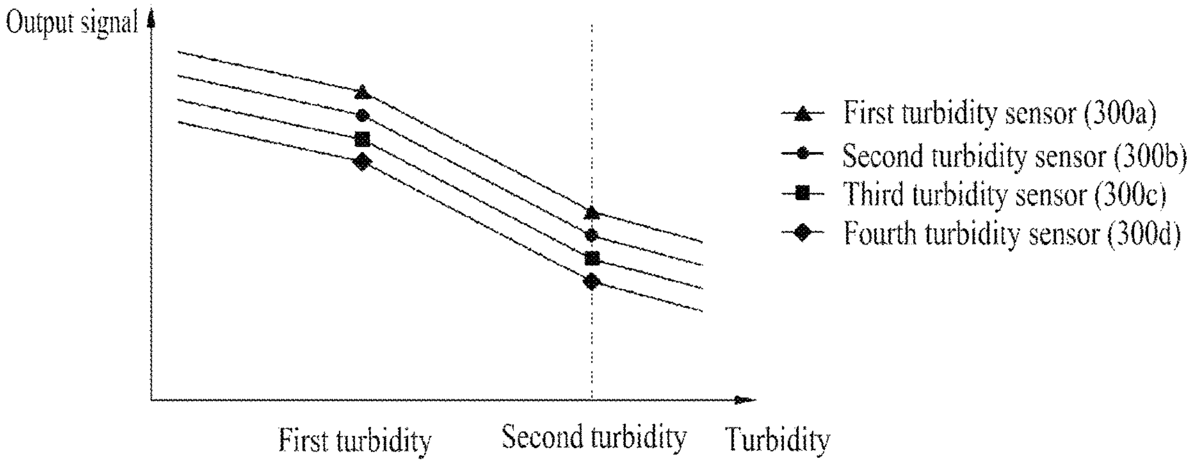
FIGS. 2 and 3 are measurement data of turbidity sensors according to an embodiment.
Figure 3:
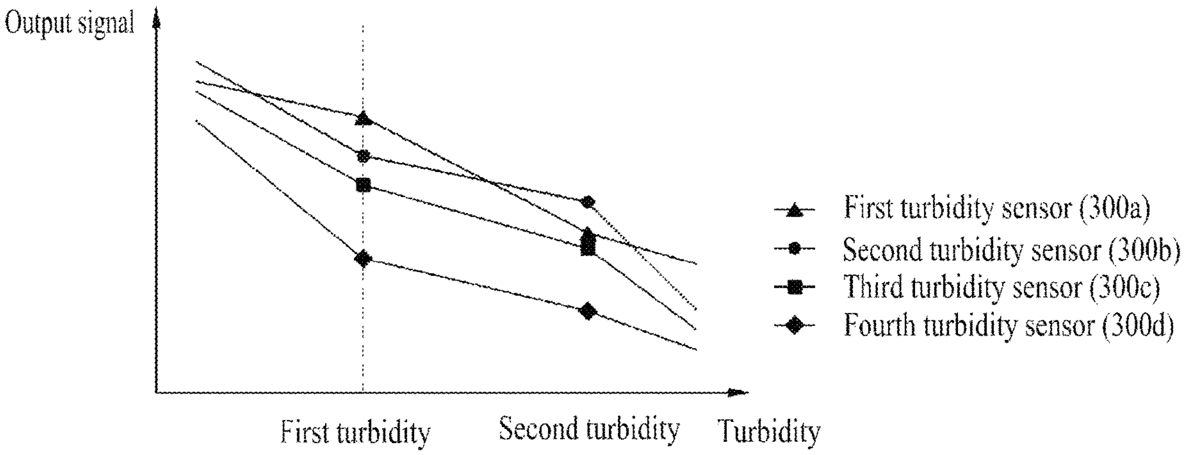

FIGS. 2 and 3 are measurement data of turbidity sensors according to an embodiment. In this regard, the turbidity sensor in FIGS. 2 and 3 refers to the turbidity sensor 300 illustrated in FIG. 1.

Even though the turbidity sensors 300 are mass-produced in the same manner, the voltages applied to the resistors 314 may be different from each other for media having the same turbidity. For example, even when the same current is applied to the light irradiators 311 via the second pins P2, there may be a deviation in the light emitted from the light irradiators 311 due to a manufacturing deviation between the light irradiators 311. Alternatively, even when the same light is received by the light receivers 312, the potentials applied to the points 315 between the transistors 313 and the resistors 314 may be different from each other due to a manufacturing deviation between the light receivers 312.

The memory 322 of the turbidity sensor 300 may contain the correction data for correcting the voltage applied to the resistor 314, that is, the signal measured via the ADC 323. When the light is irradiated to the media having the same turbidity from the turbidity sensors 300 that are mass-produced in the same manner, the correction data may correct the voltages applied to the resistors 314 to the same value.

As shown in FIG. 2, output signals corresponding to the same turbidity of the turbidity sensors 300*a* to 300*d* that are mass-produced in the same manner may be different from each other, but deviations therebetween based on the turbidities may be the same as or similar to each other. For example, a difference in the output signal between turbidity sensors 300*a* to 300*d* that are mass-produced in the same manner in a first turbidity and a difference in the output signal between the turbidity sensors 300*a* to 300*d* that are mass-produced in the same manner in a second turbidity may be the same as or similar to each other.

That is, graph forms of the output signals based on the turbidities of the turbidity sensors 300*a* to 300*d* that are mass-produced in the same manner may be similar to each other. In this case, the correction data contained in the memory 323 may be a value that moves the graph of the output signal based on the turbidity in parallel. For example, the output signal acquired from the first turbidity sensor 300*a* may be multiplied by a specific value a to be the same output signal as the output signal of the third turbidity sensor 300*c*. Similarly, the output signal acquired from the second turbidity sensor 300*b* may be multiplied by a specific value b to be the same output signal as the output signal of the third turbidity sensor 300*c*. In addition, the output signal acquired from the fourth turbidity sensor 300*d* may be multiplied by a specific value d to be the same output signal as the output signal of the third turbidity sensor 300*c*. In this regard, the specific values a, b, l, and d may be the correction data of the first to fourth turbidity sensors 300*a* to 300*d*, respectively.

Figure 4:
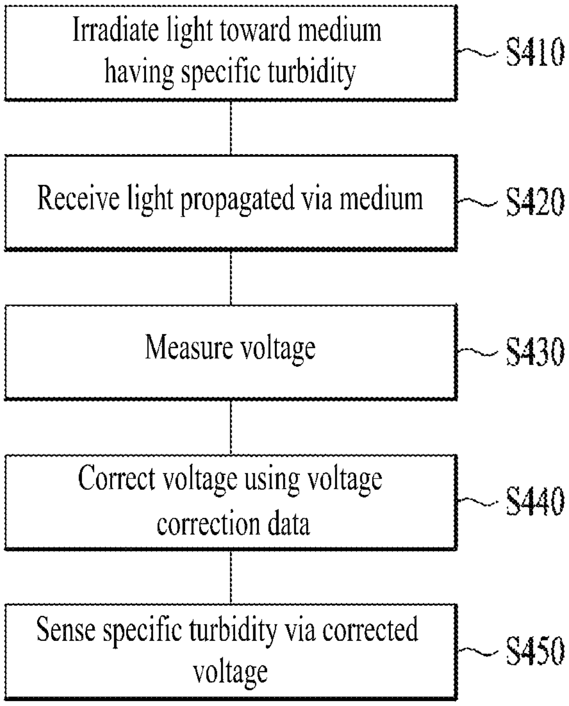
FIG. 4 is a turbidity sensing process of a turbidity sensor according to an embodiment.

As shown in FIG. 3, the output signals of the turbidity sensors 300*a* to 300*d* that are mass-produced in the same manner may be different from each other based on the turbidities. That is, the graph forms of the output signals based on the turbidities of the turbidity sensors 300*a* to 300*d* that are mass-produced in the same manner may be different from each other. In this case, the correction data contained in the memory 323 may be different from each other based on the turbidity sensors 300*a* to 300*d* and the turbidities. For example, when the output signal acquired from the first turbidity sensor 300*a* is an output signal corresponding to the first turbidity, the output signal may be multiplied by a specific value corresponding to the first turbidity to be corrected so as to be the same as the output signal acquired in response to the first turbidity from the third turbidity sensor 300*c*. That is, the correction data contained in the memory 323 may be a value that corrects the graphs of the output signals based on the turbidities of the turbidity sensors 300*a* to 300*d* that are mass-produced in the same manner to match with each other. 1451 FIG. 4 is a turbidity sensing process of the turbidity sensor 300 according to an embodiment. In this regard, the turbidity sensor in FIGS. 2 and 3 refers to the turbidity sensor 300 illustrated in FIG. 1.

Specifically, FIG. 4 shows a processor for offsetting the deviation in the output signals of the turbidity sensors 300*a* to 300*d* mass-produced in the same manner as illustrated in FIGS. 2 to 3.

A method for controlling the turbidity sensor 300 may include an operation (S410) of irradiating the light toward the medium. In this regard, the turbidity sensor 300 may irradiate the light to the medium using the light irradiator 311.

The method for controlling the turbidity sensor 300 may include an operation (S420) of irradiating the light toward the medium and then receiving the light propagated via the medium. In this regard, the turbidity sensor 300 may receive the light propagated via the medium using the light receiver 312.

The method for controlling the turbidity sensor 300 may include an operation (S430) of receiving the light propagated via the medium and then measuring the signal corresponding to the received light. In this regard, the signal corresponding to the received light may be the voltage applied to the resistor 314.

The method for controlling the turbidity sensor 300 may include an operation (S440) of correcting the signal corresponding to the received light using the pre-stored correction data. In this regard, the correction data may be voltage correction data for correcting the voltages applied to the resistors 314 of the turbidity sensors 300 that are mass-produced in the same manner so as to be the same with each other. The correction data may be stored in the memory 322 based on the turbidity sensor 300. The correction data may be a value that offsets the deviation occurring in the signal corresponding to the received light due to the manufacturing tolerance of the turbidity sensors 300.

The method for controlling the turbidity sensor 300 may include an operation (S450) of correcting the signal corresponding to the received light using the correction data and sensing the turbidity of the specific medium via the corrected signal. In this regard, the corrected signal may be converted into the digital signal via the ADC 323, and may be operated as the corresponding turbidity by the MCU 321.

Figure 5:
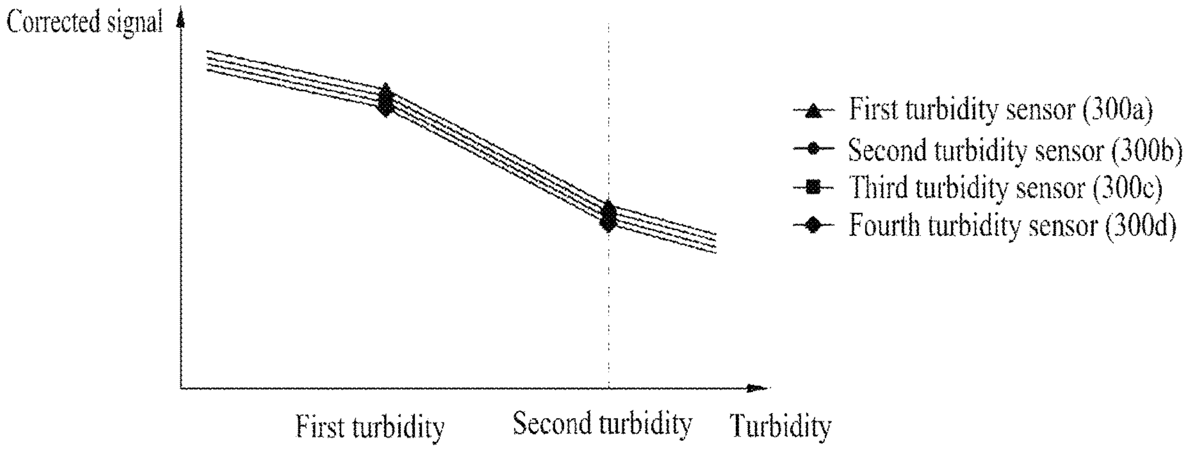
FIG. 5 is corrected measurement data of turbidity sensors according to an embodiment.

FIG. 5 is corrected measurement data of turbidity sensors according to an embodiment. In this regard, the turbidity sensor in FIG. 5 refers to the turbidity sensor 300 illustrated in FIG. 1.

The turbidity sensors 300 that are mass-produced in the same manner may offset the occurrence of the deviation in the voltages applied to the resistors 314 using the correction data stored in the memory 323.

Specifically, FIG. 5 shows an example in which the graphs of the measured signals based on the turbidities illustrated in FIGS. 2 and 3 are corrected to match each other using the correction data.

Figure 6:
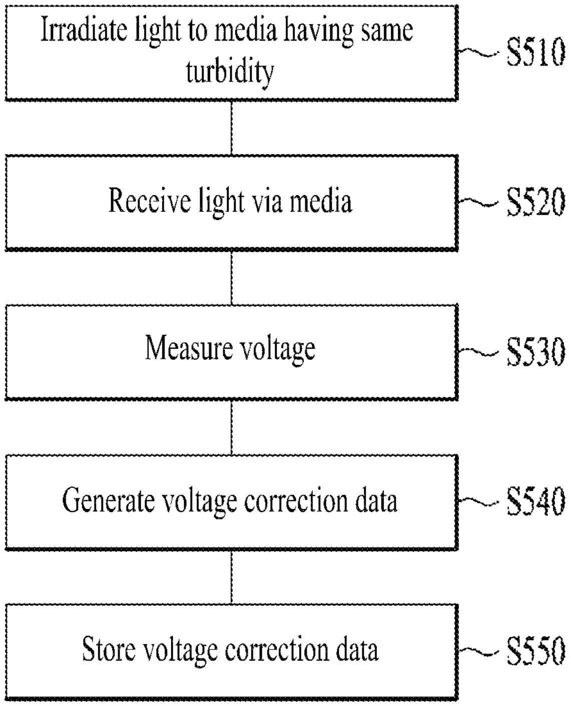
FIG. 6 is a process for acquiring correction data of a turbidity sensor according to an embodiment.

FIG. 6 is a process for acquiring correction data of a turbidity sensor according to an embodiment.

The method for controlling the turbidity sensor may include an operation of generating and storing the correction data.

Specifically, the operation of generating and storing the correction data may include an operation (S510) of irradiating, by the turbidity sensors that are mass-produced in the same manner, the light to the media having the same turbidity, respectively. In this regard, the media having the same turbidity may correspond to a reference turbidity medium.

The operation of generating and storing the correction data may include an operation (S520) of receiving, by the turbidity sensors that are mass-produced in the same manner, the light via the media, respectively, after irradiating the light to the media having the same turbidity, respectively.

The operation of generating and storing the correction data may include an operation (S530) of measuring, by the turbidity sensors that are mass-produced in the same manner, the voltages applied to the resistors 314 corresponding to the media having the same turbidity.

The operation of generating and storing the correction data may include an operation (S540 and S550) of generating, by the turbidity sensors that are mass-produced in the same manner, data for correcting the voltages applied to the resistors 314 corresponding to the media having the same turbidity. In this regard, one of the turbidity sensors that are mass-produced in the same manner becomes a reference turbidity sensor, and a voltage applied to the resistor 314 of the reference turbidity sensor may be set as a reference voltage. A value for correcting a voltage applied to the resistor 314 of another turbidity sensor to the reference voltage may be generated as the correction data.

In the operation of generating and storing the correction data, the correction data may be stored in the memory to correspond to each of the turbidity sensors that are mass-produced in the same manner. For example, first correction data may be stored in the memory of the first turbidity sensor among the turbidity sensors that are mass-produced in the same manner, and second correction data may be stored in the memory of the second turbidity sensor among the turbidity sensors that are mass-produced in the same manner. In this regard, the first correction data and the second correction data may be different from each other.

Figure 7:
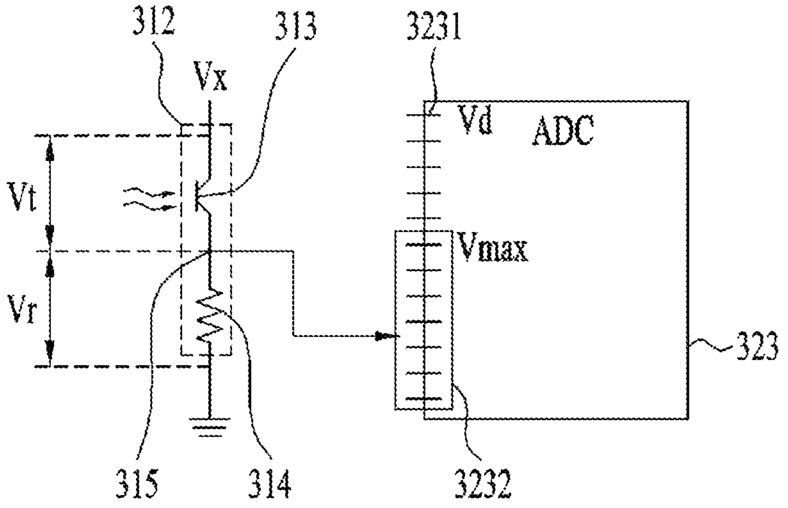
FIG. 7 is a portion of a circuit configuration including a transistor and a converter in a turbidity sensor according to an embodiment.

FIG. 7 is a portion of a circuit configuration including the light receiver 312 and the ADC 323 in the turbidity sensor 300 according to an embodiment. In this regard, the turbidity sensor 300 in FIG. 7 refers to the turbidity sensor 300 illustrated in FIG. 1.

The turbidity sensor 300 may convert the voltage applied to the resistor 314 included in the light receiver 312 to the digital signal via the ADC 323, and may sense the turbidity of the medium by making the converted digital signal to correspond to the turbidity of the medium.

In this regard, the light receiver 312 may include the transistor 313 having an emitter to which the resistor 314 is connected. Specifically, a collector of the transistor 313 may be connected to a point with a high fixed potential Vx. In this regard, the high fixed potential Vx may be provided from the processor 320 via the first pin P1. The transistor 313 may receive the light propagated from the base via the medium, and may apply a current to the resistor 314 via the emitter. In this regard, the resistor 314 may have one end connected to the emitter of the transistor 313 and the other end connected to a point with a low fixed potential (ground). In this regard, the low fixed potential (ground) may be provided from the processor 320 via the third pin P3.

The voltage applied to the resistor 314 may vary depending on an intensity of light applied to the base of the transistor 313. In this regard, the intensity of light may correspond to a degree of illumination.

The ADC 323 may recognize the voltage across the resistor 314 as the measured signal, and convert the measured signal into the digital signal. In this regard, the voltage across the resistor 314 may correspond to a potential difference between the reference voltage (ground) and the point 315 between the resistor 314 and the transistor 313.

The ADC 323 may convert the measured voltage into the digital signal by dividing a measured voltage range 3231 into a plurality of sections. For example, the ADC 323 may convert a voltage between 0 V and a maximum voltage Vd into the digital signal.

The conventional turbidity sensor 300 used the ADC 323 with the maximum voltage Vd, which may be converted into the digital signal, equal to the voltage Vx applied to the collector. That is, the measured voltage range 3231 of the ADC 323 corresponded to a range of a voltage higher than 0 V and lower than the voltage Vx applied to the collector. However, a maximum Vmax of the voltage applied to the resistor 314 was inevitably lower than the voltage Vx applied to the collector. That is, a range 3232 of the voltage applied to the resistor 314 was narrower than the specific voltage range 3231 of the ADC 323 and was included in the specific voltage range 3231. This lowered an efficiency of the ADC 323.

Figure 8:
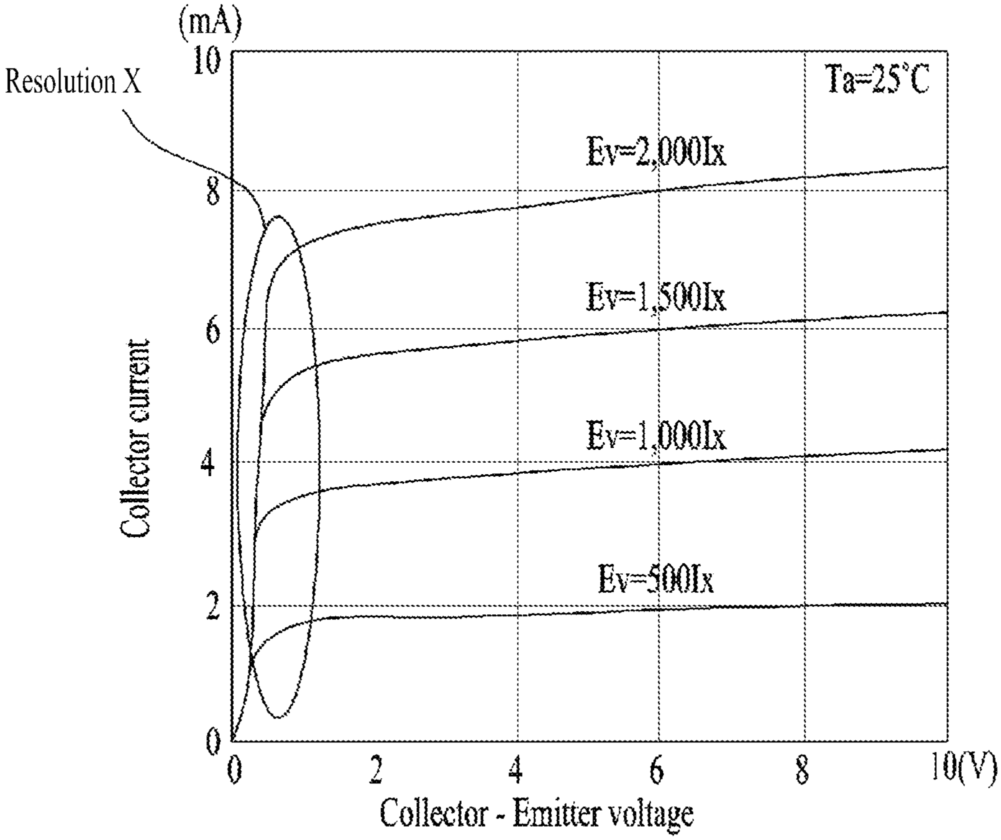
FIG. 8 is a diagram for illustrating properties of a transistor used in a turbidity sensor according to an embodiment.

FIG. 8 is a diagram for illustrating properties of the transistor 313 used in a turbidity sensor according to an embodiment. Hereinafter, a description will be made with reference to FIG. 7.

The transistor is not able to identify the intensity of light applied to the base thereof when the voltage between the collector and the emitter is lower than a certain voltage.

The turbidity sensor is a sensor for sensing the turbidity of the medium via the intensity of the light applied to the base of the light receiver, and a resolution for the intensity of the light applied to the base of a level should be equal to or higher than a certain level. In this regard, a voltage with the resolution for the intensity of the light of the level equal to or higher than the certain level may correspond to a minimum voltage required to drive the transistor.

For example, FIG. 8 shows an example in which the level of the resolution for the intensity of light applied to the base is equal to or higher than the certain level when the voltage between the collector and the emitter is equal to or higher than 1 V.

That is, when the transistor 313 and the resistor 314 are connected to each other in series in the turbidity sensor 300, a voltage drop of a certain level inevitably occurs in the transistor 313.

That is, the maximum voltage Vmax applied to the resistor 314 is inevitably lower than the fixed voltage Vx applied to the collector of the transistor 313.

Figure 9:
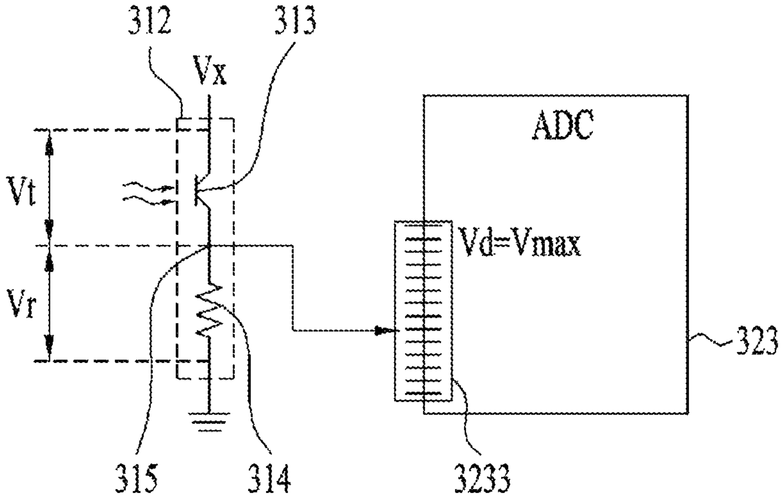
FIG. 9 is a diagram for illustrating a converter improved in consideration of properties of the transistor described in FIG. 8.

FIG. 9 is a diagram for illustrating a converter improved in consideration of properties of the transistor described in FIG. 8. Hereinafter, a description will be made with reference to FIG. 1.

The turbidity sensor 300 may include the ADC 323 with a voltage range corresponding to a variable range of the voltage applied to the resistor 314. In this regard, the ADC 323 may have a range 3233 of the voltage that may be converted into the digital signal corresponding to the range of the voltage that may be applied to the resistor 314.

That is, the maximum voltage Vd that may be converted into the digital signal in the ADC 323 may correspond to the maximum voltage Vmax that may be applied to the resistor 314.

The maximum voltage Vmax that may be applied to the resistor 314 may correspond to a magnitude obtained by subtracting a minimum voltage required to drive the transistor 313 from the fixed voltage Vx applied to the collector of the transistor 313. In this regard, the minimum voltage required to drive the transistor 313 as a voltage between the collector and the emitter of the transistor 313 may be a minimum voltage required to identify the degree of illumination of the light received from the base.

The above detailed description should not be construed as limiting in all respects, but should be considered as illustrative. The scope of the present disclosure should be determined by a reasonable interpretation of the appended claims, and all changes within the equivalent scope of the present disclosure are included in the scope of the present disclosure.

The invention claimed is:

1. A turbidity sensor comprising:
- a light irradiator for irradiating light toward a medium;
- a light receiver for receiving received light that has passed through the medium;
- a transistor included in the light receiver and applied with a current in response to the received light;
- a resistor included in the light receiver and applied with the current, wherein a voltage corresponding to the received light is applied across the resistor;
- a memory containing a correction value for correcting the voltage applied across the resistor; and
- a processor configured to:
- correct the voltage applied across the resistor using the correction value to generate a corrected voltage; and
- calculate a turbidity of the medium using the corrected voltage,
- wherein the correction value includes:
- a value for correcting the voltage applied across the resistor to a reference voltage established by irradiating light through a reference turbidity medium.

2. The turbidity sensor of claim 1,
- wherein the processor includes:
- a converter for converting the voltage applied across the resistor into a digital signal, wherein a voltage measurement range of the converter corresponds to a variable range of the voltage applied across the resistor.

3. The turbidity sensor of claim 2, wherein a maximum measurable voltage of the converter corresponds to a maximum voltage applied across the resistor.

4. The turbidity sensor of claim 3, wherein the maximum voltage applied across the resistor has a magnitude corresponding to a magnitude obtained by subtracting a minimum voltage required to drive the transistor from a fixed voltage applied to the transistor.

5. The turbidity sensor of claim 4, wherein the transistor includes:
- a collector applied with the fixed voltage;
- a base for receiving the received light that has passed through the medium; and
- an emitter applied with the current in response to the received light received by the base, wherein the emitter is connected to the resistor,
- wherein the fixed voltage applied to the collector corresponds to a voltage having a magnitude obtained by adding the minimum voltage required to drive the transistor to the maximum measurable voltage of the converter.

6. A method for controlling a turbidity sensor, the method comprising:
- irradiating light toward a medium;
- receiving received light that has passed through the medium;
- measuring a voltage across a resistor by applying a current corresponding to the received light;
- correcting the voltage across the resistor using a correction value stored to generate a corrected voltage; and
- calculating a turbidity of the medium using the corrected voltage,
- wherein the correction value includes:
- a value for correcting the voltage applied across the resistor to a reference voltage established by irradiating light through a reference turbidity medium.

7. The turbidity sensor of claim 1, wherein the received light includes at least one of light refracted by the medium and light reflected by the medium.

8. The turbidity sensor of claim 7, wherein the processor includes a converter for converting the voltage applied across the resistor into a digital signal,
- wherein the processor is further configured to measure another turbidity of the medium using the digital signal, and
- wherein when the received light is the light refracted or the light reflected by the medium, the voltage applied across the resistor is proportional to the another turbidity of the medium.

9. The turbidity sensor of claim 1, wherein a fixed voltage is applied to the transistor and a variable voltage is applied to the resistor in response to the received light.

* * * * *